Patented Jan. 17, 1939

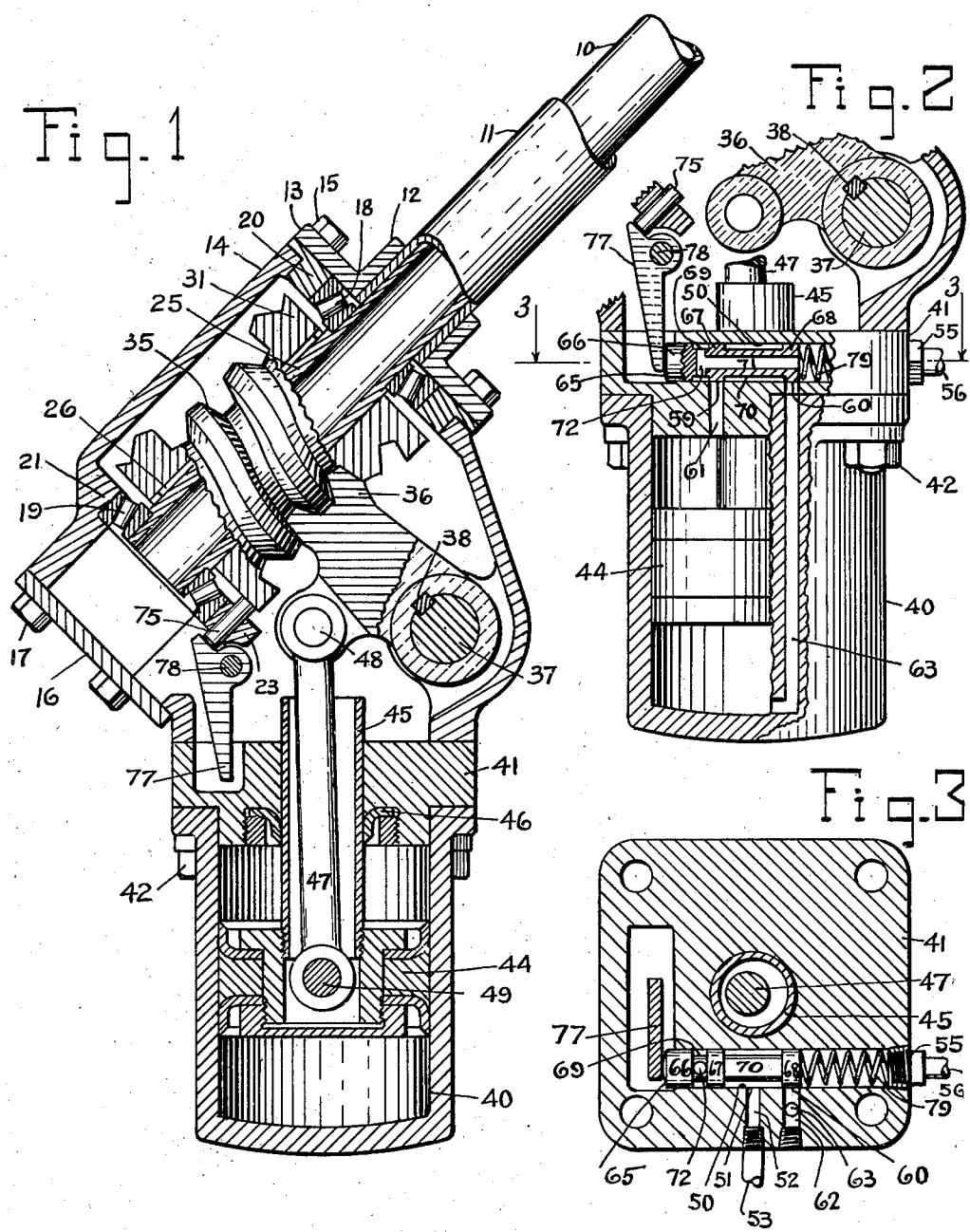

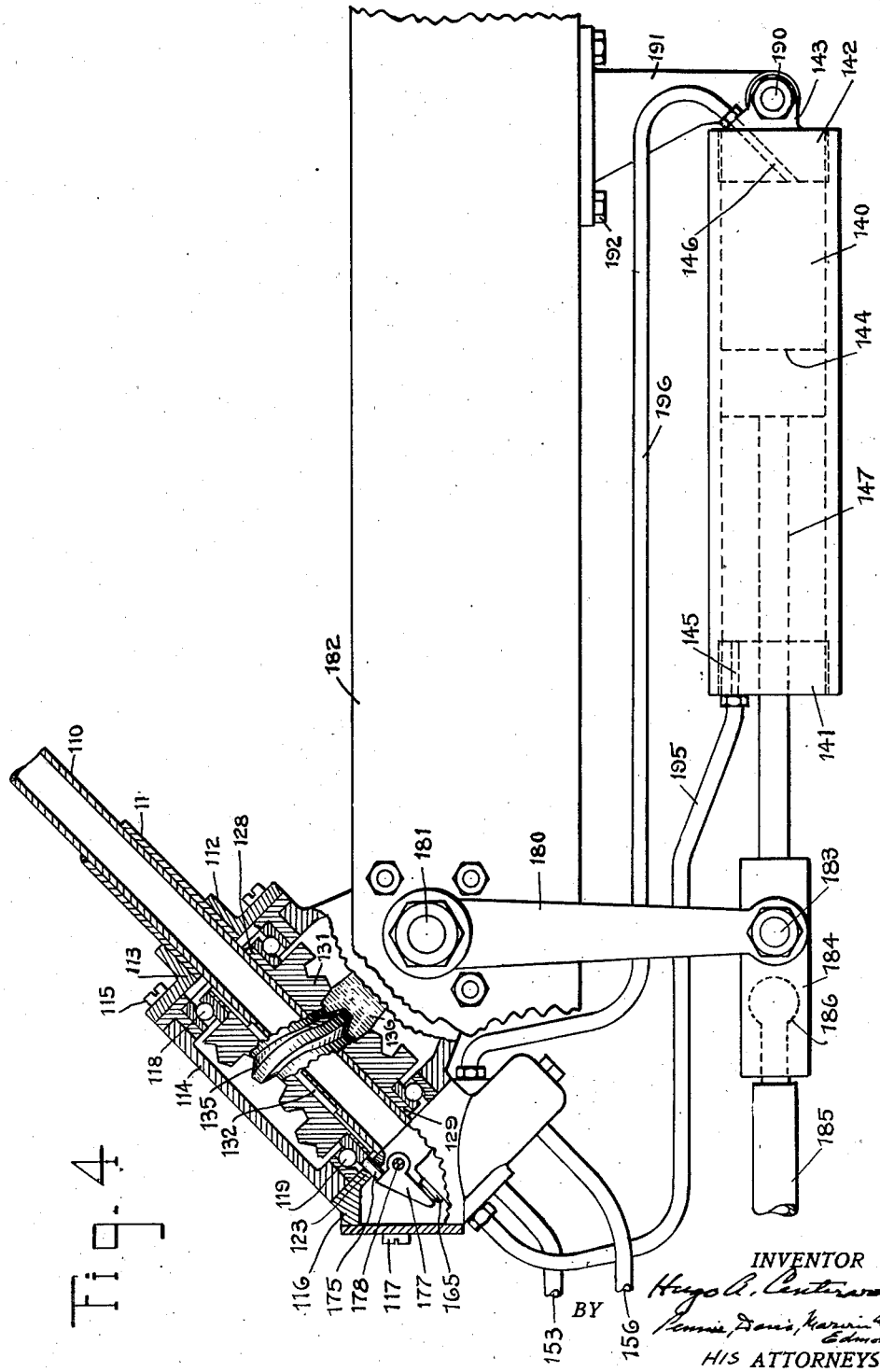

2,143,858

UNITED STATES PATENT OFFICE 2,143,858

STEERING MECHANISM FOR ROAD VEHICLES

Hugo A. Centervall, Brooklyn, N. Y., assignor to Manly Corporation, New York, N. Y., a corporation of Delaware Application November 12, 1934, Serial No. 752,686

11 Claims. (Cl. 180—79.2)

This invention relates to control mechanisms for power operated devices and more particularly to control mechanisms for power devices employed to actuate the steering apparatus of a motor vehicle.

The principal object of the invention is to provide an improved mechanism of this class that is simple, compact and reliable in action.

A further object is to provide an improved mechanism of this class in which manual power may be transmitted to the steered wheels without imposing any load whatsoever upon the control mechanism.

Other and more specific objects will appear from the following description of illustrative embodiments of the invention shown in the accompanying drawings. The invention is suitable for use in controlling the operation of any preferred type of power apparatus such as those operated pneumatically, electrically, mechanically or hydraulically. I have, however, chosen to illustrate the invention in connection with an hydraulic steering apparatus for a conventional automobile, but its use is not limited to this type of power operated means or for this particular purpose.

In the accompanying drawings:

Fig. 1 is a side view, partly in vertical section, showing one embodiment of the invention as applied to the steering apparatus for a conventional automobile.

Fig. 2 is a side view of the power apparatus, showing the hydraulic cylinder assembly partly broken away to show the control valve, the valve bore and connecting passages in vertical section.

Fig. 3 is a transverse sectional view taken along the line 3—3 of Fig. 2.

Fig. 4 is a view, partly in section and partly diagrammatic, illustrating a modification.

Referring now to Figure 1 of the drawings, the steering gear includes the usual rotatable steering shaft 10 to whose upper end is attached the usual steering wheel (not shown) by which said shaft 10 is manually turned to control the steering of the vehicle. The steering shaft 10 is enclosed within the usual hollow steering post 11 whose lower end is received within and appropriately fastened to the bore of the hub 12 of the top cover member 13 which is fastened in position on the steering gear casing 14 as by the screws 15. The lower end of the steering gear casing is closed by a bottom cover 16 held in place as by appropriate screws 17. The lower end of the steering shaft 10 extends into the steering gear casing 14 where it is rotatably supported by the bearing members 18 and 19 of rolling element anti-friction bearings, here shown as tapered roller bearings, which are received within the end hubs 20 and 21 respectively of the steering gear casing 14.

The apparatus also includes a worm member 31, hereinafter termed the "worm", which is employed both for actuating the control apparatus when steering is done by power and for transmitting manual power from the steering shaft 10 to other parts of the steering apparatus when the steering is done manually. For this purpose the worm 31 is keyed for rotation with the steering shaft 10 and is adapted to be moved axially within the limits determined by stops. In the present embodiment the lower end of the steering shaft 10 is formed with an enlarged worm-carrying portion 25 positioned near its lower end and preferably extending from the inner race of the bearing 18 to the inner race of the bearing 19. By this construction, the ends of the enlarged worm-carrying portion 25 form shoulders which position the steering shaft 10 against axial movement with respect to the bearings 18 and 19 and the other portions of the steering apparatus. The worm 31 is operatively connected with the worm-carrying portion 25 of the steering shaft 10 by keys 26 which are received in appropriate longitudinal keyways in said worm 31 and said portion 25 of said steering shaft 10. The worm 31 is of a length less than the distance between the bearings 18 and 19, and its longitudinal keyways are of greater length than the keys 26 and may conveniently extend the entire length of said worm 31. The arrangement is such that the worm 31 is keyed for rotation with the steering shaft 10 but is freely slidable lengthwise thereon, thus permitting said worm 31 to actuate the control valve mechanism as will be later explained.

In order that manual power may be transmitted from the steering shaft through the worm 31 to other parts of the steering apparatus it is necessary to provide stops which limit the axial movement of said worm 31 with respect to said shaft 10. In the present embodiment the inner races of the bearing members 18 and 19 are utilized as the stops for the worm 31 and by reference to Figure 1 of the drawings it will be evident that the axial movement of said worm 31 with respect to the steering shaft 10 is limited to the difference between the length of the worm and the distance between the inner races of said bearings 18 and 19. This is an important feature of the present invention as it provides stops which rotate simultaneously with steering shaft 10 and the worm 31 which are likewise entirely independent of the control mechanism.

The outer surface of the worm 31 is formed with the usual worm or spiral thread 35 which meshes with the usual sector 36. The sector 36 is keyed to the cross shaft 37 as by the key 38, and said cross shaft 37 is presumed to be operatively connected with a conventional front road wheel assembly of an automobile in the usual manner, so that clockwise rotation of said cross shaft 37 moves said front road wheels so as to cause the vehicle to turn toward the left, while counter-clockwise rotation of said cross shaft 37 moves said front road wheels so as to cause the vehicle to turn toward the right.

The power apparatus in the present embodiment is hydraulically operated and as here shown comprises a cylinder 40 closed at its lower end and provided with a cover member 41 which closes its upper end. The cylinder assembly is securely fastened to the steering gear casing 14 as by the screws 42. Slidably fitted within the cylinder 40 is a double acting piston 44 from the upper end of which projects a tubular stuffing box 45. The stuffing box 45 extends through an appropriate opening in the cover 41 and is of such length as to close said opening in all positions of the piston 44. The arrangement is such that the stuffing box 45 is free to move lengthwise through the opening in the cover 41 while forming a substantially fluid-tight fit therewith, appropriate packing 46 being used to prevent leakage. Within the stuffing box 45 is a connecting rod 47 whose upper end is pivotally connected with the sector 36 as at 48 and whose lower end is likewise pivotally connected with the piston 44 as at 49.

The operation of the hydraulic power apparatus is regulated by movement and position of the control valve 65. In the present instance the control valve 65 is slidably fitted within the valve bore 50 which is formed in the cover member 41, as clearly shown in Figs. 2 and 3. The valve bore 50 is provided with an inlet or high pressure port 51 on the inner end of a short passage 52 whose outer end is suitably connected with the source of pressure fluid, not shown, by the pipe 53. The end of the valve bore 50 is closed by the threaded plug 55 having an opening, not shown, through which the suitably connected return or exhaust pipe 56 communicates with said valve bore 50. The valve bore 50 is also provided with a pair of ports 59 and 60 respectively, which are located on either side of the high pressure port 51 as clearly shown in Figs. 2 and 3. The port 59 is positioned on one end of the passage 61, formed in the cover member 41 which leads to and connects with the upper end of the cylinder 40. Similarly, the port 60 is at one end of the short passage 62, formed in the cover 41, whose other end connects with a longitudinal passage 63, formed in the wall of the cylinder 40 and leading to and connecting with the lower end of said cylinder.

The control valve 65 is provided with three heads, 66, 67 and 68 respectively, which are separated by the reduced portions 69 and 70 respectively. The heads 67 and 68 are adapted to cover the ports 59 and 60 respectively, when the control valve 65 is in its neutral position as shown in Figs. 2 and 3. A longitudinal passage 71 extends through the control valve 65 from its end adjacent the plug 55 to the reduced portion 69 where it connects with a radial passage 72. When the control valve 65 is moved out of its neutral position and toward the right, as viewed in Figs. 2 and 3, the port 60 is connected with the reduced portion 70 of said control valve 65 and hence pressure fluid is admitted to the lower end of the cylinder 40; the port 59 is then connected with the reduced portion 69 and fluid is free to pass out of the upper end of the cylinder 40, through the connecting passages and into the return pipe 56. Similarly, when the control valve 65 is moved out of its neutral position and toward the left, as viewed in Figs. 2 and 3, pressure fluid is admitted to the upper end of the cylinder 40 and the lower end of said cylinder 40 is connected with the return pipe 56.

Movement and position of the control valve 65 are effected and controlled by the axial movement and position of the worm 31. For this purpose the lower end of the worm 31 is adapted to slidably bear against the upper end of the pin 75 which is freely movable lengthwise in its retaining hole drilled in the flange 23 of the steering gear casing 14. The lower end of the pin 75 bears against the preferably shorter arm of the bell crank 77 which is pivotally supported as at 78 and whose preferably longer depending arm bears against one end of the control valve 65. The control valve 65 is adapted to be moved lengthwise of the valve bore 50, and, as viewed in Figs. 2 and 3, movement toward the right is effected by the depending arm of the bell crank 77. Movement of the control valve 65 toward the left, as viewed in Figs. 2 and 3, is effected by the spring 79 acting against the plug 55 and the adjacent end of said control valve 65. The spring 79 is adapted to move the control valve 65 toward the left as far and as rapidly as permitted by the depending arm of the bell crank 77 and said spring 79 also serves to continuously hold the parts in proper position with respect to each other; that is, the control valve 65 is held against said depending arm of said bell crank 77, the shorter arm of said bell crank 77 is held against the lower end of the pin 75 and the upper end of the pin 75 is held against the lower end of the worm 31 at all times.

When it is desired to steer the vehicle toward the left, the driver turns the steering wheel in a counterclockwise direction which imparts like motion to the steering shaft 10 and the worm 31. The worm thread 35 on the worm 31 acting against the sector 36 causes said worm 31 to move downwardly which depresses the pin 75. The bell crank 77 is thus swung on its pivot 78 so that the depending arm of said bell crank 77 moves the control valve 65 toward the right, as viewed in Figs. 2 and 3, admitting pressure fluid to the lower end of the cylinder 40 and connecting the upper end of said cylinder 40 with the return pipe 56 as hereinbefore explained. The proportion of the parts is made such that this movement of the control valve 65 occurs before the worm 31 has traveled downwardly a distance sufficient to bring its lower end into contact with the inner race of the bearing 19. The pressure fluid thus admitted to the lower end of the cylinder 40 acts against the piston 44 and moves upwardly said piston 44, the connecting rod 47 and the sector 36, causing the cross shaft 37 to turn in a clockwise direction as viewed in Figs. 1 and 2. As hereinbefore explained, the cross shaft 37 is presumed to be so connected with the front road wheels of the vehicle that this clockwise rotation of said cross shaft 37 causes said front road wheels to swing so as to turn the vehicle toward the left.

Movement of the piston 44 and its connected parts continues as long as the driver continues to turn the steering wheel in a counter-clockwise direction. As the sector 36 moves upwardly, however, it tends to carry with it the worm 31, thus acting in opposition to the tendency of said worm 31 to be moved downwardly by the reaction of worm thread 35 against the sector 36. Axial movement of the worm 31 with respect to the steering shaft 10 is thus determined by the relative rates of movement of the sector 36 and the worm thread 35 of said worm 31. The axial movement of the worm 31 is thus determined, which in turn produces and controls movement of the pin 75, the bell crank 77 and the control valve 65, and hence regulates the operation of the hydraulic power apparatus.

There is consequently no axial movement of the worm 31 on the steering shaft 10 as long as the steering wheel is turned in a counter-clockwise direction at a rate which imparts a speed to the worm thread 35 corresponding to the rate of movement of the sector 36. Hence there is no movement of the control valve 65 and the piston 44 continues its upward movement. But whenever the speed of the sector 36 exceeds the speed of the worm thread 35, as when the driver turns the steering wheel more slowly or ceases to turn it, the sector 36 acts against the worm thread 35 and moves the worm 31 upwardly with respect to the steering shaft 10. As the worm 31 moves upwardly, it permits upward movement of the pin 75 which permits the bell crank 77 to swing on its pivot 78 so that the depending arm of said bell crank 77 moves toward the left as viewed in Figs. 1 and 2, which in turn permits the control valve 65 to be moved toward the left; and said movement of said parts is immediately effected by the spring 79.

A follow-up action is thus set up, so that when the driver stops turning the steering wheel, the control valve 65 immediately returns to its neutral position and movement of the piston 34 and its connected parts ceases.

To steer the vehicle toward the right, the driver turns the steering wheel in a clockwise direction and the operation of the controls, the piston 44 and its connected parts is obviously reversed. Pressure fluid is now admitted to the upper end of the cylinder 40 and fluid is exhausted from the lower end of said cylinder.

Steering is thus effected by power and it is necessary for the driver to expend only enough energy to move the control members and this is negligible. While the movements of the various parts have been described progressively, it will be understood that these movements take place so rapidly that they are substantially instantaneous.

It will be understood from the foregoing that there is a corresponding definite vertical position of the piston 44 for every position of the steering control members and the device operates to continuously maintain this corresponding position. For purposes of illustration, let us assume that the parts are in the position shown in Fig. 1, that the steering shaft 10 is stationary and that the piston 44 is displaced downwardly, because of leakage from the lower end of the cylinder 40, for example. As this displacement of the piston 44 commences, the sector 36 is also moved downwardly and, acting against the worm thread 35, moves the worm 31 downwardly on the steering shaft 10. The control valve 65 is thus moved toward the right, as viewed in Figs. 2 and 3, admitting pressure fluid to the lower end of the cylinder 40, which almost instantaneously moves the piston 44 upwardly and restores it to its proper position, the control valve 65 likewise being restored to its neutral position by the follow-up action already described. It is therefore impossible for the piston 44 to be displaced any material distance away from its proper position and any displacement that may occur is almost instantaneously rectified.

If the source of pressure fluid should fail or if the power apparatus should for any reason fail to respond, steering may be effected manually by the same movement of the same control already described for power steering, though the driver must obviously exert more energy. In this case the operation of the control members is initially the same as for power steering, but when the power apparatus fails to respond and to produce the follow-up action, the worm 31 continues its upward or downward axial movement on the steering shaft 10 until its adjacent end strikes the inner race of one or the other of the bearing members 18 or 19, as the case may be. Further axial movement of the worm 31 on the steering shaft 10 is thus prevented and manual power from the steering wheel may be transmitted through the worm 31, the sector 36 and the cross shaft 37 to the front road wheels of the vehicle in the same manner as in a conventional steering gear adapted for manual operation only. When steering is done manually, the entire load resulting from the upward or downward axial thrust is taken by the bearings 18 and 19 respectively and, of course, the steering gear casing 14. No work of steering is done by the pin 75, the bell crank 77 or the control valve 65 at any time, regardless of whether steering is effected by power or manually; the only pressure ever exerted on these parts is the very small amount necessary to effect their movement and which is determined by the spring 79, their function being limited to the control of the operation of the hydraulic apparatus.

In the modified form shown in Fig. 4, the lower end of the steering shaft 110 extends into the steering gear casing 114 and is rotatably supported upon an inwardly projecting circular flange 123 formed in the bottom cover member 116 of said casing 114, said bottom cover 116 being appropriately fastened to said casing 114, as by the screws 117. The steering shaft 110 is enclosed within the usual hollow steering post 111 whose lower end is received within and appropriately fastened to the bore of the hub 112 on the top cover member 113 of the steering gear casing 114, said cover 113 being fastened in position on said casing 114 as by screws 115.

Within the steering gear casing 114 is the worm member 131, which is provided with a central bore for receiving the steering shaft 110 to which it is connected for simultaneous rotation by keys 132 in appropriate longitudinal keyways in said shaft 110 and in the bore of said worm 131. The keyways in the bore of the worm 131 are longer than the keys 132 and may conveniently extend the entire length of said bore. The arrangement is such that the worm 131 is securely keyed for rotation with the steering shaft 110 but is freely slidable lengthwise thereon. The ends of the worm 131 are formed with the usual hubs 128 and 129 respectively which are received within the inner races of the bearing members 118 and 119 respectively, here shown as ball bearings of the "angular contact" type. The outer races of the bearings 118 and 119 respectively are received within appropriate end bores of the steering gear casing 114 which in turn is supported upon the frame or other portion of the vehicle in any appropriate manner. The proportions of the parts are such that the distance between the centers of the bearing surfaces of the outer races of the bearings 118 and 119 is slightly greater than the distance between the centers of the bearing surfaces of their inner races, so that when the worm 131 is midway between said outer races, the balls of each bearing may roll for a short distance upon the straight portion of the faces of said outer races. This construction permits a slight longitudinal movement of the worm 131, in either direction away from its middle position, with respect to the steering shaft 110.

The lower face of the inner race of the bearing 119 is adapted to slidably bear against one end of the pin 175 which is freely movable lengthwise in its retaining hole drilled in the flange 123 of the bottom cover member 116. The lower end of the pin 175 bears against one arm of the bell crank 177 which is pivotally supported upon the bottom cover member 116 as at 178 and whose depending arm bears against one end of the control valve 165.

The outer surface of the worm 131 is formed with the usual worm or spiral thread 135 which meshes with the usual sector 136 positioned within and pivotally supported upon the steering gear casing 114 in the usual manner. The sector 136 is operatively connected in the customary manner for simultaneous movement with the steering arm 180 whose upper end is pivotally mounted in the conventional way, as at 181, upon the side frame member 182 of the vehicle. The lower end of the steering arm 180 is pivotally connected as at 183 with the connector 184 whose forward end is connected to the rear end of the drag link 185, here shown as broken off, by the usual ball and socket construction as indicated by the dotted lines at 186.

The drag link 185 is here presumed to be connected in the usual manner with the front road wheel assembly of a conventional automobile so that forward movement of the steering arm 180 and the drag link 185 causes the front wheels to swing so as to turn the vehicle toward the left and similarly rearward movement of said steering arm 180 and said drag link 185 causes said front road wheels to swing so as to turn the vehicle toward the right.

The hydraulic power apparatus includes a cylinder 140 shown diagrammatically as having its ends closed by appropriate plugs 141 and 142. The rear end of the cylinder 140 is supported by the lug 143 projecting from the plug 142 and is rockably connected as at 190 to the depending bracket 191 carried by the side frame member 182 to which said bracket 191 is attached as by bolts 192. Slidable within the cylinder 140 is a double-acting piston 144 attached to the usual piston rod 147 which extends forwardly through a suitable opening in the end plug 141 and which is attached to the rear end of the connector 184 in any appropriate manner. The forward end of the cylinder 140 has a fluid connection with the control valve mechanism through the drilled passage 145 in the plug 141 and the appropriately connected pipe 195 and similarly the rear end of said cylinder 140 has fluid connection with the control valve mechanism through the drilled passage 146 in the plug 142 and the appropriately connected pipe 196. As the cylinder 140 has no lengthwise movement with respect to the side frame member 182 and the steering gear casing 114, the pipes 195 and 196 need be of only sufficient flexibility to permit said cylinder 140 to rock on its pivot 190 to adjust itself to the varying angularity with respect to said side frame member 182 caused by the swinging of the steering arm 180.

The control valve mechanism is here shown schematically. It may be of any desired type but is presumed to be similar to that shown in Figs. 1, 2 and 3, hereinbefore described. In this instance, however, the control valve bore is formed in the bottom cover member 116 of the steering gear casing 114 which closes the lower end of said steering gear casing 114. The valve bore is connected with the source of pressure fluid, not shown, as by the suitably connected pipe 153 and similarly said valve bore communicates with a reservoir, not shown, by the appropriately connected exhaust or return pipe 156. Likewise, the pipes 195 and 196 are here presumed to be suitably connected with the valve bore so that movement and position of the control valve 165 regulates the admission of pressure fluid to one or the other end of the cylinder 140, while permitting fluid to be exhausted from its other end. Movement of the control valve toward the right, as viewed in Fig. 4, is produced and controlled by axial movement of the worm 131 with respect to the shaft 110, while movement toward the left is effected by means of a spring, not shown, which moves said control valve 165 and the depending arm of the bell crank 177 as far and as rapidly toward the left as permitted by the worm 131 and the inner race of the bearing 119.

The operation of this modified form of the invention is generally similar to that hereinbefore described. The worm 131 may, however, move axially with respect to the shaft 110 because the outer races of the bearings 118 and 119 are spaced more distantly than the inner races of said bearings. As axial movement of the worm 131 takes place, therefore, the balls of each bearing may roll for a short distance upon the straight portions of the adjacent faces of the outer races of the bearings 118 and 119. It will be observed, however, that the inner races of the bearing members 118 and 119 have no movement with respect to the worm 131 and that axial movement of said worm 131 with respect to shaft 110 is accomplished through movement of the inner races of said bearings with respect to their outer races. It will also be observed that when steering is effected through manual power, the balls of these bearings merely roll to the limit determined by the length of the straight portion of the inner faces of the outer races of said bearings so that the operation of the device is substantially identical with that of steering gears intended for manual operation only. It will further be observed that at no time and under no conditions is any load whatsoever imposed upon the control mechanism and that when steering is done by manual power the resulting axial thrust is taken by the bearing member 118 or 119 as the case may be. As the races of ball bearings are usually hardened and ground, the inner race of the bearing member 119 forms an ideal bearing surface for the adjacent end of the pin 175.

The control valves 65 and 165 have been herein shown and described as of the normally closed type which cuts off communication between the cylinder and the valve bore when the control valve is in its neutral position but the invention is not limited to the use of a control valve of this type. If preferred, for example, the control valve may be made of the normally open type by which both ends of the cylinder are in communication with the high pressure inlet port when said control valve is in its neutral position, or other types of control valve may be employed.

While the invention has been described in connection with hydraulically operated power apparatus, it is suitable for use with other types of power apparatus, such as those operated electrically, pneumatically or mechanically. When such other forms of power apparatus are employed, it will be understood that the control mechanism for such apparatus is to be actuated and controlled by axial movement of the worm members 31 or 131 as above described.

It is to be understood that the above is merely an exemplifying disclosure and that changes may be made in the apparatus without departing from applicant's invention which is defined in the appended claims. Thus, for example, the steering gear illustrated herein is of the worm and sector type, but if desired, steering gears of the cam and lever type, of the screw and nut type and the like may be used. Also the worm members illustrated herein are of the conventional "hour-glass" type. This worm may have either a constant or a varying pitch. Moreover, worm members having a uniform diameter and of either constant or varying pitch may be employed. It is to be understood, therefore, that the terms "worm" or "worm member", as used in this specification and the appended claims, are intended to include the driving member of a steering gear of these and other equivalent types.

Although the power-operated device of the present invention has been disclosed in connection with a steering apparatus for automobiles, it will be understood that the invention can be employed, if desired, with steering apparatus for boats, such, for example, as motor boats, and it will be further understood that the term "motor vehicle" as used in the appended claims includes boats.

I claim:

1. In a device of the character described, a manually rotatable shaft, a worm rotatable with said shaft, said worm being axially movable, a driven member coacting with said worm, power-operated means for actuating said driven member, control mechanism for said power-operated means actuated by axial movement of said worm, bearing members for rotatably supporting said worm comprising a pair of rolling element bearings having outer and inner races, said outer races being more distantly spaced than said inner races and acting to limit the axial movement of said worm to cause said driven member to be actuated manually.

2. In a steering device for motor vehicles, a manually rotatable steering shaft, a steering gear casing, a driving member positioned within said casing, said driving member being keyed for rotation with said steering shaft and axially movable thereon, a driven member coacting with said driving member, power-operated mechanism for actuating said driven member, control means for said power-operated means actuated by relative movement between said driving member and said steering shaft, and a pair of rolling element bearings having outer and inner races, said outer races being supported by said steering gear casing and said inner races supporting and rotating with said steering shaft, said inner races forming stops to limit the axial movement of said driving member with respect to said steering shaft to cause said driven member to be actuated manually.

3. In a device of the class described, a casing, a manually rotatable shaft extending therewithin, a worm rotatable with said shaft, said worm being axially movable, a driven member coacting with said worm, power-operated means for actuating said driven member, control mechanism for said power-operated means actuated by axial movement of said worm, and a pair of rolling element bearings at the opposite ends of said worm for rotatably supporting said shaft, said bearings having inner and outer races and being adapted to resist thrust, said outer races being carried by the casing and said inner races being secured to said shaft, said worm being adapted in its axial movement to engage said inner races which serve as stops to limit said axial movement of the worm in either direction to cause said driven member to be actuated manually, the endwise thrust of said worm being taken by said rolling element bearings.

4. In a device of the class described, a casing, a manually rotatable shaft, a worm rotatable with said shaft and axially movable within said casing, a driven member coacting with said worm, power-operated means for actuating said driven member, control mechanism for said power-operated means actuated by axial movement of said worm, and a pair of rolling element bearings at the opposite ends of said worm for rotatably supporting said shaft, said bearings having inner and outer races and being adapted to resist thrust, the outer races being mounted in the casing and the inner races being positioned to limit the axial movement of said worm in either direction to cause said driven member to be actuated manually, the thrust of said worm being taken by said bearings, and said control mechanism for said power-operated means comprising a valve-actuating member and a pin coacting therewith, said pin being slidably mounted adjacent one of said rolling element bearings with its inner end in position to be engaged by the end of said worm.

5. A steering device for motor vehicles comprising a steering gear casing having a steering shaft extending therewithin, a driving member rotatable with said shaft and axially movable, a driven member coacting with said driving member and mounted on a driven shaft pivoted on said casing, and stops for limiting said axial movement of said driving member in either direction to cause said driven member to be actuated manually by said steering shaft, a fluid motor mounted upon said steering gear casing, a control valve, and a housing therefor for controlling said fluid motor, said valve being actuated by the axial movement of said driving member, said control valve housing being positioned between said steering gear casing and said fluid motor.

6. In a device of the character described, a manually rotatable worm having limited axial motion, a driven member coacting with said worm, power operated means for actuating said driven member, control mechanism for said power operated means actuated by axial movement of said worm, bearing members for rotatably supporting said worm comprising a pair of angular contact rolling element bearings having outer and inner races, said outer races being more distantly spaced than said inner races and acting to limit the axial movement of said worm to cause said driven member to be actuated manually.

7. In a steering device for motor vehicles, a steering gear casing, a manually rotatable driving member positioned within said casing and axially movable therein, a pair of rolling element bearings having outer races and inner races, said outer races being supported by said casing and said inner races being affixed respectively to the opposite ends of said driving member for rotatably supporting the same in said casing, the outer races of said rolling element bearings being more distantly spaced than the inner races thereof to permit axial movement of said driving member, said outer races coacting with the rolling elements of said bearing to form stops to limit said axial movement, a driven member coacting with said driving member, power operated means for actuating said driven member, control mechanism for said power operated means including a member actuated by said axial movement of said driving member to cause said power operated means to actuate said driven member.

8. In a device of the class described, a casing, a manually rotatable worm positioned in said casing and axially movable therein, a driven member coacting with said worm, power operated means for actuating said driven member, control mechanism for said power operated means actuated by said axial movement of said worm, and a pair of rolling element bearings at the opposite ends of said worm, said bearings having inner and outer races and being adapted to resist thrust, the outer races being mounted in the casing and the inner races being positioned to limit the axial movement of said worm in either direction to cause said driven member to be actuated manually, the thrust of said worm being taken by said bearings, and said control mechanism for said power operated means comprising a valve actuating member slidably mounted adjacent one of said rolling element bearings in position to be engaged by the end of said worm.

9. In a device of the class described, a casing, a manually rotatable worm positioned in said casing and axially movable therein, a driven member coacting with said worm, power operated means for actuating said driven member, control mechanism for said power operated means actuated by axial movement of said worm, and a pair of rolling element bearings at the opposite ends of said worm, said bearings having inner and outer races and being adapted to resist thrust, the outer races being mounted in the casing and the inner races being positioned to limit the axial movement of said worm in either direction to cause said driven member to be actuated manually, the thrust of said worm being taken by said bearings, and said control mechanism for said power operated means comprising a valve actuating member and means for operatively connecting the same with one end of said worm.

10. In a device of the class described, a casing, a manually rotatable worm positioned in said casing and axially movable therein, a driven member coacting with said worm, power operated means for actuating said driven member, control mechanism for said power operated means actuated by axial movement of said worm, one end of said worm having two annular areas thereon, said control mechanism having an actuating member coacting with one of said annular areas, a stop held against axial movement with respect to said casing and arranged to coact with the other of said annular areas, and a second stop on said casing at the opposite end of said worm, said stops acting to limit the axial movement of said worm to cause the driven member to be actuated manually.

11. In a device of the class described, a rotatable assembly including a manually rotatable shaft and worm, a casing, a pair of rolling element bearings for rotatably supporting said assembly on said casing, said shaft being arranged to impart rotation to said worm and said worm being movable in the axial direction, said rolling element bearings having outer and inner races, the outer races being supported by said casing and the inner races being fixed respectively to the opposite ends of said worm, the outer races being more distantly spaced than the inner races to permit the axial movement of said worm, the outer races coacting with the rolling elements of said bearings to form stops to limit said axial movement, a driven member coacting with said worm, power operated means for actuating said driven member, control mechanism for said power operated means, and a member for actuating said control mechanism coacting with the end surface of one of said inner races to transmit said axial movement of the worm to the control mechanism so as to cause said power operated means to actuate said driven member.

HUGO A. CENTERVALL.